US008515370B2

(12) United States Patent
Clement et al.

(10) Patent No.: US 8,515,370 B2
(45) Date of Patent: Aug. 20, 2013

(54) BROADBAND MULTI-CHANNEL RADIOFREQUENCY RECEIVER

(75) Inventors: Benoît Clement, Paris (FR); Gilles Latouche, Fontenay le Fleury (FR); Olivier Muller, Maisons-Laffitte (FR)

(73) Assignee: EADS Secure Networks, Elancourt (FR)

( * ) Notice: Subject to any disclaimer, the term of this patent is extended or adjusted under 35 U.S.C. 154(b) by 277 days.

(21) Appl. No.: 12/933,344

(22) PCT Filed: Mar. 17, 2009

(86) PCT No.: PCT/FR2009/050436
§ 371 (c)(1),
(2), (4) Date: Dec. 13, 2010

(87) PCT Pub. No.: WO2009/122084
PCT Pub. Date: Oct. 8, 2009

(65) Prior Publication Data
US 2011/0070852 A1    Mar. 24, 2011

(30) Foreign Application Priority Data
Mar. 18, 2008  (FR) ..................... 08 51748

(51) Int. Cl.
*H03D 7/16*    (2006.01)
(52) U.S. Cl.
USPC ......... 455/131; 455/161.3; 455/323; 455/334

(58) Field of Classification Search
USPC ..... 455/131–135, 161.1–161.3, 226.1–226.3, 455/323, 334
See application file for complete search history.

(56) References Cited

U.S. PATENT DOCUMENTS

| | | | |
|---|---|---|---|
| 6,868,288 B2 * | 3/2005 | Thompson | 607/31 |
| 2002/0090915 A1 * | 7/2002 | Komara et al. | 455/69 |
| 2003/0185311 A1 * | 10/2003 | Kim | 375/260 |
| 2005/0265483 A1 | 12/2005 | Erdogan | |

OTHER PUBLICATIONS

PCT Search Report and Written Opinion mailed Oct. 19, 2009, for PCT/FR2009/050436 filed Mar. 17, 2009.

* cited by examiner

*Primary Examiner* — Nhan Le
(74) *Attorney, Agent, or Firm* — Gardere Wynne Sewell LLP; Andre M. Szuwalski

(57) ABSTRACT

A device for receiving a broadband multi-channel radiofrequency signal includes a radiofrequency analog input stage connected to an intermediate-frequency conversion stage. The conversion stage includes at least one conversion chain having a frequency mixer that transposes the signal to an intermediate frequency connected to the input of an analog-digital converter with a high frequency sampling rate. The intermediate and sampling frequencies in each conversion chain are selected such that, considering the noise generated by the sampling overtones of the corresponding analog-digital converter, each of the radiofrequency signal channels has a signal/noise ratio that is greater at output than a predetermined value of at least one conversion chain.

19 Claims, 3 Drawing Sheets

BROADBAND MULTI-CHANNEL RADIOFREQUENCY RECEIVER

PRIORITY CLAIM

This application is a 371 filing of PCT/FR2009/050436 filed Mar. 17, 2009, which claims priority from French Application for Patent 0851748 filed Mar. 18, 2008, the disclosures of which are hereby incorporated by reference.

TECHNICAL FIELD

The present invention relates to a device for receiving a broadband multi-channel radiofrequency signal comprising a radiofrequency analog input step connected to an intermediate-frequency conversion stage. It also relates to a base station comprising such a device as well as a method for the calibration of this device.

BACKGROUND

The current radio communication systems are increasingly defined in the form of an allocated frequency band in which communication channels are defined. For a given installation, the choice of the channels used is made as a function of the channels allocated to the operator of the installation and the channels used in the environment of the installation, in order to avoid overlapping phenomena that could lead to interference with the communications (known as cell systems).

For example, the PMR (Private Mobile Radio) and TETRA systems standardized by ETSI (European Telecommunications Standards Institute) use a 5 MHz band, called system band in the remainder of this document, at approximately 400 MHz, and, within this band, the width of each channel is 25 kHz. In such a network, during the installation of a base station, 4 channels will typically be chosen as a function of the criteria mentioned previously in order to cover the communications in the cell centered on the base station, the radius of which corresponds approximately to the range of the system.

A base station thus typically comprises 4 radio receivers, each being dedicated to a given channel.

Each radio receiver of such a base station typically comprises a radiofrequency analog input step connected to an intermediate-band conversion step, the output of which is digitized by an analog-digital converter. The digitized signal is then processed by computers of the signal operation processor type in order to extract the useful information.

The analog input step typically comprises a receiving antenna making it possible to receive the radiofrequency signal. Then this signal is filtered in a band-pass filter called a preselection filter, the bandwidth of which corresponds to the frequency band of the system. The filtered signal is then amplified by a low-noise amplifier before entering the conversion step.

In a mixer connected to a local oscillator, the signal of the selected channel is transposed into a signal at the intermediate frequency, typically of the order of several tens of megahertz.

Conventionally, the transposed signal is then filtered by a band-pass filter having a bandwidth equal to the width of the channel and being centred on the intermediate frequency. At the output of the filter, an analog-digital converter, or ADC, digitizes the signal corresponding to the selected channel before digital processing, the standard configuration of a single-channel digital architecture.

ADCs now exist on the market that have sampling frequencies of approximately 100 MHz and are capable of digitizing to 13 bits ENOB (Effective Number Of Bits). A single ADC then allows the whole of the frequency band of the system to be digitized. Thus, the 4 chains which work independently in parallel on the 4 channels are replaced by a single chain. The transposition stage is followed by a band-pass filter, the bandwidth of which corresponds from then on to the frequency band of the system. This filter is used in order to eliminate the spurious mixing products generated by the transposition. The transposed and filtered signal is then digitized by a single high-frequency ADC. The separation of the channels is then carried out by the downstream digital processing.

This embodiment has the advantage of reducing the number of analog and ADC chains by a factor equal to the number of channels to be digitized.

The counterpart is the greater complication of the digital part which must in particular separate the channels before demodulating each of them.

Moreover, the ADC generates spurious signals which can be impossible to eliminate in the downstream digital steps. The SFDR (Spurious Free Dynamic Range) is the parameter which dimensions the performance of the ADC with respect to this defect.

In a standard fashion, two types of non-linearity give rise to the ADC spurious signals:

The non-linearities of the transfer function of the converter (irregularity of the runs) characterized by INL (Integral Non Linearity) and DNL (Differential Non Linearity) and The non-linearities of the analog parts of the ADC. These non-linearities generate overtones relating to the signals present at the input of the ADC which fold back and can interfere with the useful signal. Thus in the frequency band of the system, situations can occur in which a useful signal having a relatively low energy is adjacent to the overtone of another signal (useful or interference signal) with relatively high energy. The non-linearity of the ADC can transform this proximity into a noise overlaying the useful signal, noise that is generated by spurious frequencies originating from the interference signal. This phenomenon can be characterized using a spectral analysis at the output of the ADC, the latter being supplied by the interference signal. The analysis then shows a peak at the level of the primary frequency of the interference signal as well as a certain number of spurious peaks, the power of which is potentially greater than the minimum value of a useful signal as defined in a standard. If the frequency of one of these spurious peaks corresponds to the frequency of the useful signal, the latter will experience interference, possibly having a signal/noise ratio that is too low to allow recovery of the information carried.

In order to reduce the spurious responses due to the transfer function of the ADC, dither noise is commonly used; the addition of a noise uncorrelated with the useful signal still makes it possible to use several 'runs' of the ADC, which minimizes the responses linked to the non-linearities of a certain part of the transfer function of the ADC. On the other hand, no effective technique currently exists making it possible to reduce the level of the responses due to the non-linearities of the analog parts.

The signals capable of generating these non-linearities are the set of signals received by the base station, i.e. the useful signals received, those transmitted in the direction of the neighboring base stations and the transmissions of other radiofrequency systems which are not eliminated by the different filters of the receiving chain.

In fact, as previously explained, the channels of the base station are chosen to be different from the channels used by the surrounding base stations in order to avoid interference. However, during the digitization, these frequencies can generate folding overtones, the frequencies of which are in the useful channels and therefore generate a noise that is detrimental to the quality of the transmission.

It would therefore be particularly advantageous to obtain a receiving device that makes it possible to obtain a good signal/noise ratio at the level of the useful channels while minimizing or suppressing the overtones which interfere with these channels.

SUMMARY

In order to resolve one or more of the drawbacks mentioned previously, a device for receiving a broadband multi-channel radiofrequency signal comprises a radiofrequency analog input stage connected to an intermediate-frequency conversion stage, said conversion stage comprising at least one conversion chain comprising a frequency mixer transposing the signal at an intermediate frequency connected to the input of an analog-digital converter having a high sampling frequency, characterized in that the intermediate frequency and the sampling frequency of each conversion chain are selected such that, while considering the noise generated by the sampling overtones of the corresponding analog-digital converter, each of the channels of the radiofrequency signal has a signal/noise ratio greater than a predetermined value at the output of at least one conversion chain.

Particular features or embodiments that can be used alone or in combination are:
- the conversion stage comprises at least two conversion chains, each conversion chain having an intermediate frequency/sampling frequency pair different from the other conversion chains.
- the sampling frequencies of the analog-digital converters are identical and the intermediate frequencies are different for all the conversion chains.
- the separation of the intermediate frequencies is a multiple of a predetermined frequency.
- the predetermined frequency is equal to the spacing between channels.
- the input step comprises several receiving chains, each comprising an antenna and operating in a diversity of antennas such that at least one conversion chain is connected in series to each receiving chain.
- one single conversion chain only is connected in series to each receiving chain.

In a second aspect of the invention, a base station of a wireless telecommunication network is characterized in that it comprises a receiving device as above.

In a particular embodiment, the selection of the sampling and transposition frequencies is carried out in order to increase the signal/noise ratio taking account of the overtone signals originating from the frequencies of the channels internal to the base station or used by adjacent base stations.

In a third aspect of the invention, a method for the calibration of a receiving device as above comprises the steps of:
a) spectral characterization of each analog-digital converter adapted in order to determine the main overtones generated by signals having a frequency in the intermediate band in question,
b) determination of the relative positions in the system band of the useful signals and the interference signals,
c) selection for a first conversion chain of an intermediate frequency/sampling frequency pair such that at least one useful signal has a signal/noise ratio greater than the predetermined value at the output of the conversion chain,
d) if at least one useful signal has a signal/noise ratio less than the predetermined value, re-execution of step c) with another conversion chain and another intermediate frequency/sampling frequency pair such that this useful signal has a signal/noise ratio greater than the predetermined value at the output of this chain.

In a particular embodiment, this calibration method is such that steps c) and d) are reiterated in order to optimize at least one of the following criteria:
- minimizing the number of useful signals having a signal/noise ratio greater than a predetermined value in only one of the conversion chains;
- minimizing the number of conversion chains required in order to process the set of useful signals; and/or
- maximizing the number of useful signals having a signal/noise ratio greater than a predetermined value in the set of conversion chains.

BRIEF DESCRIPTION OF THE DRAWINGS

The invention will be better understood on reading the following description, given by way of example only, with reference to the attached drawings, in which.

DETAILED DESCRIPTION OF THE DRAWINGS

In the figures showing different embodiments, identical or similar elements as far as possible have the same reference.

Figure 1:
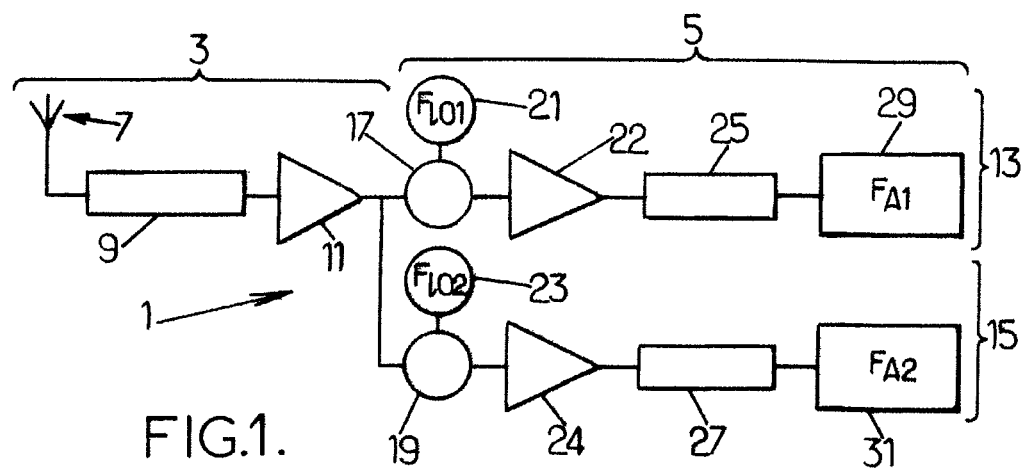
FIG. 1 is a diagrammatic view of a receiving device according to a first embodiment of the invention.

With reference to FIG. 1, a receiving device 1 comprises a radiofrequency analog input stage 3 connected to an intermediate-frequency conversion stage 5.

The analog input stage 3 comprises in a standard fashion a receiving antenna 7 making it possible to receive the radiofrequency signal. Then this signal is filtered in a band-pass filter 9 called a preselection filter, the bandwidth of which corresponds to the frequency band of the system. The filtered signal is then amplified by a low-noise amplifier 11 before entering the conversion step. This input stage uses technologies well known to a person skilled in the art and therefore will not be described in greater detail.

The intermediate-frequency conversation stage 5 comprises two conversion chains 13, 15 connected in parallel to the output of the input stage 3.

Each chain 13, 15 comprises a mixer 17, 19 connected to a local oscillator 21, 23. The local oscillators 21, 23 oscillate at the frequencies $F_{IO1}$ and $F_{IO2}$. The frequencies $F_{IO1}$ and $F_{IO2}$ are slightly different so that the signal is transposed at intermediate frequencies $FI_1 = FI + \Delta f_1$ and $FI_2 = FI + \Delta f_2$, $\Delta f_1$ and $\Delta f_2$ being different.

On each chain 13, 15, at the output of the mixer 17, 19, are arranged in series, an intermediate-frequency amplifier 22, 24, an intermediate band-pass filter 25, 27, then a high-frequency analog-digital converter 29, 31, the output of which is connected to a standard signal-processing computer (not shown).

The intermediate filters 25, 27 are band-pass filters centered around the intermediate frequency FI with a bandwidth equal to or very slightly greater than the bandwidth of the system, i.e. in the example, approximately 5 MHz.

Each ADC 29, 31 is of the type described previously, i.e. having a sampling frequency $Fa_1$, respectively $Fa_2$, for example approximately 100 MHz. A person skilled in the art knows how to determine the sampling frequencies and the intermediate frequency which allow Shannon's theorem to be respected, taking account of the useful band of the system. Thus, for example, for a sampling frequency of 100 MHz, an intermediate frequency of 70 MHz and a useful band of the system of 5 MHz, the conditions are respected; the useful digitized signal is centered around the −30 MHz frequency (band [−32.5;−27.5] MHz) and will not interfere with its image located around 30 MHz (band [27.5;32.5] MHz).

Figure 2:
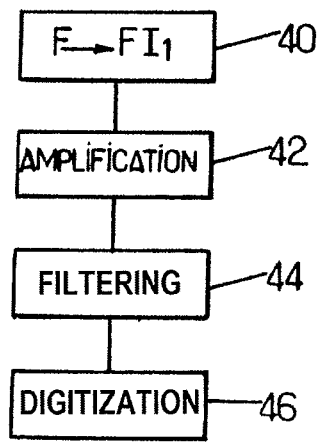
FIG. 2 is a flow chart of the operation of a conversion chain of the device in FIG. 1.

The operation of a conversion chain, for example chain 13, is as follows, FIG. 2.

The mixer 17 transposes the input radio signal in a standard fashion at step 40 to an intermediate-frequency signal $FI_1$. Typically, when the base radio frequency is of the order of 400 MHz, the frequency $FI_1$ is approximately 70 MHz. Thus, in the example of a signal having a 5 MHz band, each channel will be at a frequency $FI_{channel}$ comprised between $FI_1$−2.5 MHz and $FI_1$+2.5 MHz, the width of the channel being very narrow compared to the bandwidth.

The amplifier FI 22 in step 42 makes it possible to boost the gain and mask the out-of-band mismatching exhibited by the intermediate filter 25, so that the mixer works under optimum conditions. A person skilled in the art moreover knows how to add the amplification and attenuation elements required for suitable distribution of the gains, wherever he considers necessary in the chain.

In step 44, the intermediate filter 25 eliminates from the signal, at the output of the amplifier 22, the overtones generated by the previous steps, in particular the transposition step, which are outside the system band and which can only generate noise during sampling.

When a signal is digitized at the frequency FI in step 46, the ADC 29 generates overtones $H_k$ for the reasons explained previously. The frequency of each overtone associated with one of the signals present in the bandwidth of the receiver is a multiple of the frequency of said signal modulo the sampling frequency of the ADC i.e.

$$H_k = k*(FI + \Delta f_{channel}) \text{modulo } FA_1.$$

Thus, for each signal received, whether it is useful or spurious, the frequency of these overtones depends on the intermediate frequency of the signal and the sampling frequency.

As is well known, the power of the overtones decreases rapidly with the order of the latter and therefore, in practice, only the first overtones must be eliminated from the processing as they can generate too great a noise.

It should be noted that for a particular ADC, it is possible to carry out a characterization by spectral analysis in order to detect the overtones that are sufficiently powerful to adversely affect the signal/noise ratio.

A pair (intermediate frequency FI/sampling frequency Fa) is then selected, in the knowledge of the intermediate frequencies of the useful channels and the population of overtones, so that the frequencies $H_k$ of the undesirable overtones are outside the frequencies of the useful channels. In particular, the selection will be made in order to minimize the impact of the overtones generated by known interference frequencies such as the receiving frequencies of the base station or the receiving frequencies of the adjacent base stations.

Thus, the signal/noise ratio of each useful channel is maintained greater than a predetermined value linked for example to the standard or to the signal processing capacities. It should be noted that the shift does not operate equally for all the frequencies due, in particular, to the non-linearity of the ADC and the folding phenomena. This variable shift makes it possible to separate the spurious signals from the useful signals by a judicious choice of the intermediate and sampling frequencies.

However, in certain circumstances, such as for example a very noisy environment, it is possible that no FI-Fa pair allows a good signal/noise ratio to be obtained for all the useful channels.

The use of a second conversion chain 15 then makes it possible, by the selection of another pair of values ($FI_2$;$Fa_2$) to obtain a good signal/noise ratio for the channels which are noisy in the first conversion chain 13. It is understood that it is thus possible to place in parallel as many conversion chains as necessary so that all the useful signals are obtained with a signal/noise ratio greater than the predetermined value.

It is thus advantageously possible to adapt the complexity of the receiving device, and therefore its cost, to the working environment of the base station. In a low-noise environment and with low use of channels, the transposition step will comprise only a single conversion chain, while in a noisy environment and with the use of many channels, several conversion chains will be used.

Figure 3A:
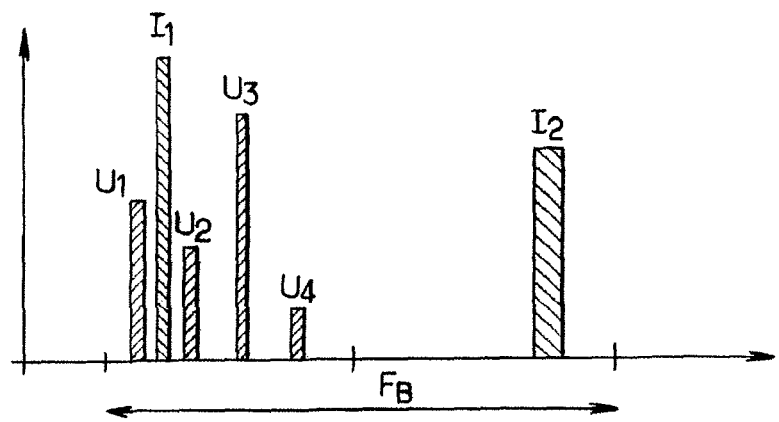
FIG. 3A is a diagrammatic view showing an illustrative frequency spectrum upstream of a receiving device such as that in FIG. 1.

In order to illustrate the operation of the receiving device, it is assumed that four useful channels $U_1$, $U_2$, $U_3$, $U_4$ coexist on the system band FB, FIG. 3A. The environment of the device is such there are also two interference frequencies $I_1$ and $I_2$ For example, $I_1$ corresponds to the frequency of an adjacent station and $I_2$ is a signal transmitted in the direction of a base station belonging to another coexisting transmission system in the same area.

Figure 3B:
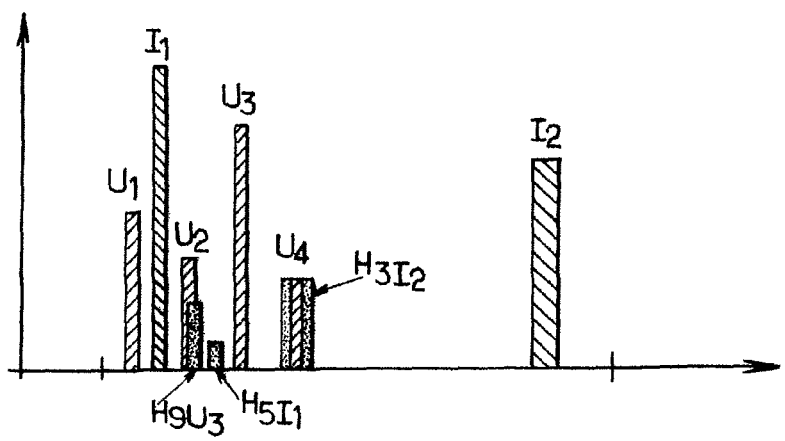
FIGS. 3B and 3C are diagrammatic views showing the frequency spectrum at the output of the conversion chain of the device in FIG. 1 when it receives the spectrum of frequencies shown in FIG. 3A.

After transposition and digital conversion using a first intermediate frequency/sampling frequency pair, the spectrum at the output of the converter appears as shown in FIG. 3B.

It is noted that the tone $H_{9U3}$ corresponding to the $9^{th}$ overtone of the useful signal $U_3$ partially folds back onto the signal $U_2$. The latter then cannot be demodulated by the digital chain of the base station as the minimum signal/noise ratio is not satisfied. Similarly $H_{3I2}$ corresponding to the third overtone of the signal $I_2$ totally masks the signal $U_4$ that it is not possible to demodulate. On the other hand, the fifth overtone $H_{5I1}$ of the signal Ii does not cause a problem as it is sufficiently separated from the useful signals $U_2$ and $U_3$.

Figure 3C:
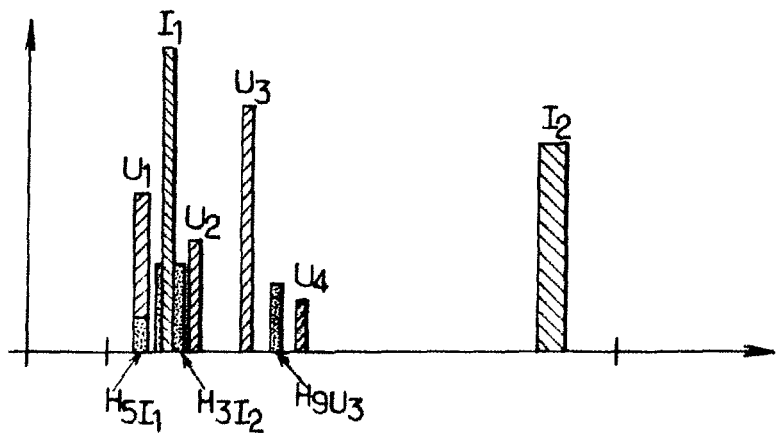

By modifying the intermediate frequency/sampling frequency pair, FIG. 3C, the frequency spectrum is modified. The fifth overtone $H_{5I1}$ partially folds back onto the useful signal $U_1$. The latter then can no longer be demodulated as the minimum signal/noise ratio is not reached.

The fifth overtone $H_{3I2}$ folds back onto the interference signal $I_1$ but this does not present a problem as $I_1$ is not a useful signal.

Similarly the ninth overtone $H_{9U3}$ of the signal $U_3$ does not present a problem as it is separated from the frequencies $U_3$ and $U_4$.

Thus assuming that FIG. 3B represents the output of the first conversion chain and that FIG. 3C represents the output of the second conversion chain, it is noted that it is possible to demodulate $U_1$ on the first conversion chain, $U_2$ and $U_4$ on the second conversion chain and $U_3$ on one or the other, or more advantageously, by combining the result of the two routes.

Figure 4:
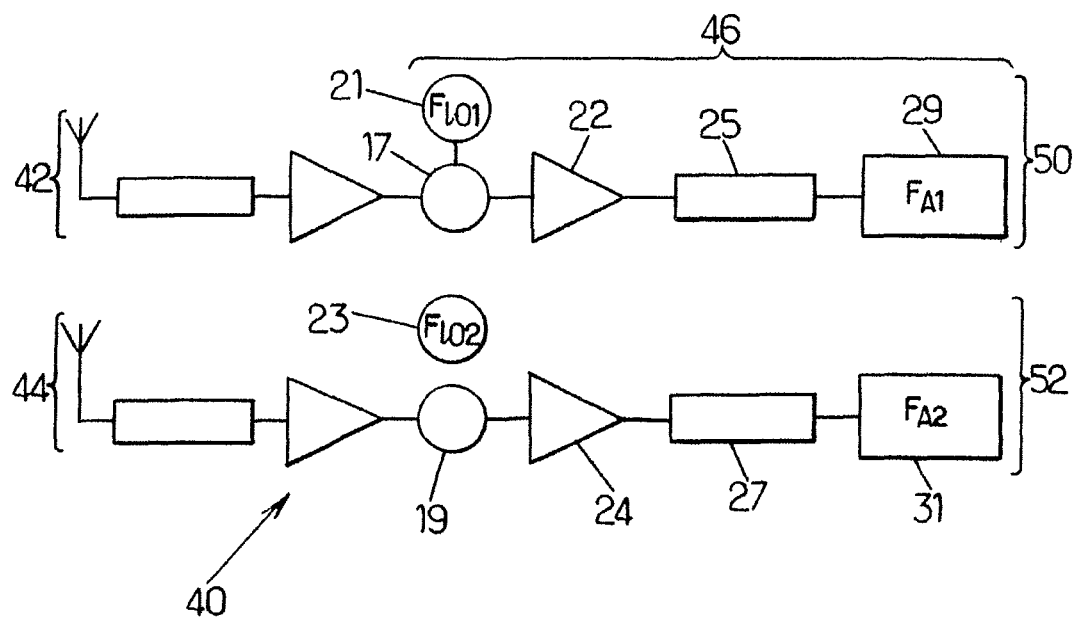
FIG. 4 is a diagrammatic view of a receiving device according to a second embodiment of the invention.

In a second embodiment, FIG. 4, the base station operates with a diversity of antennas. The receiving device 40 comprises at the level of the input step two analog receiving chains 42, 44 similar to the input step 3 of the first embodiment and a conversion step 46 comprising two conversion chains 50, 52 identical to the conversion chain 13, 15 of the first embodiment, each being connected at the output of one of the receiving chains 42, 44. Thus, unlike the first embodiment where two conversion chains are connected in parallel to the output of an input step, the second embodiment comprises two separate sets each constituted by an antenna, a receiving chain and a conversion chain.

The choice of the pair (FI, Fa) of each conversion chain is carried out as in the first embodiment.

This embodiment benefits from the well known advantages linked to the antenna diversity such as multiple-path robustness, etc.

Thus, in this embodiment, the example shown in FIGS. 3A, 3B and 3C demonstrates that the signal U3 can advantageously benefit from the antenna diversity gain.

It should be noted that in this embodiment, there are as many receiving devices as antennas and that it is not limited to two, which makes it possible to retain the antenna diversity over a maximum of useful channels.

This embodiment allows optimum use of the components of the receiving device by combining the advantages of the antenna diversity with those described above of diversification of the intermediate frequency/sampling frequency pair.

Figure 5:
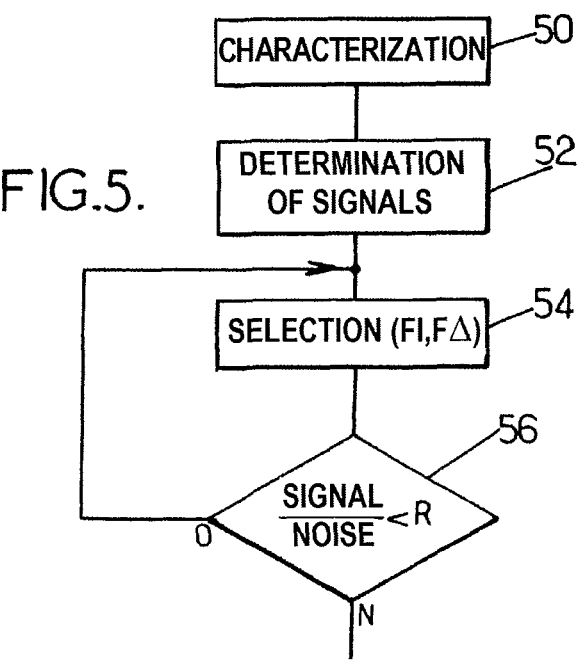
FIG. 5 is a flow chart of a method of calibration of the devices in FIG. 1 or 4.

During the installation of a base station comprising such a receiving device, it is therefore necessary to calibrate the device by selecting the intermediate frequency/sampling frequency pairs appropriate to the environment of the base station, FIG. 5.

To this end, the output spectrum of each analog-digital converter is characterized, in step 50, in order to determine the main overtones generated by signals having a frequency in the intermediate band in question.

Then, the relative positions of the useful signals and the interference signals are determined, in step 52, for this base station.

For a first conversion chain, the sampling frequency/intermediate frequency pair is selected, in step 54, so that at least one useful signal has a signal/noise ratio greater than the predetermined value at the output of the conversion chain.

Then in step 56 a check is carried out to find if at least one useful signal remains having a signal/noise ratio less than the predetermined value. If this is the case, step 54 is re-executed with another conversion chain, continuing until all the signals have a signal/noise ratio greater than the predetermined value at the output of at least one conversion chain.

The invention has been illustrated and described in detail in the drawings and the previous description. The latter must be considered as illustrative and given by way of example and not as limiting the invention to this description alone. Many variant embodiments are possible, the general case being with N radio chains, each followed by a certain number of intermediate-frequency conversion chains.

II is particularly advantageous to use the same ADC model for all the conversion chains and to have a single sampling frequency for all the conversion chains. Thus, the downstream digital processing is significantly simplified as then it is based only on a single clock rate. Otherwise, it becomes necessary to provide means of synchronization and standardization of sampling frequency to make it possible, during the digital processing operations, to combine the streams originating from the different conversion chains or, which is equivalent in terms of complexity, provide digital processing chains specific to each conversion chain, each digital chain having its own frequency.

The differences between the conversion chains then bear on the intermediate-frequency variations $\Delta f$. The latter are selected preferably within a frequency range such that the intermediate filter is of the same type for all the conversion chains ($\Delta f$ very small in comparison with the bandwidth of the filter). Thus only the local oscillators must be differentiated in order to generate different frequencies. This advantageously makes it possible to standardize the components used by the conversion chains over a single range.

The variations $\Delta f$ are advantageously chosen to be multiples of a predetermined frequency and preferably, multiples of the spacing between channels. Thus, the digital processing can easily be transposed between the different conversion chains by a simple modification of the number of the channel to be demodulated. In particular, when the variation $\Delta f$ is such that the frequency of a useful signal $Fsig_1$ in a first conversion chain is equal to the frequency of a second useful signal $Fsig_2$ in a second conversion chain, the digital processing of the first useful signal will advantageously be identical to the digital processing of the second useful signal.

II is also possible to dynamically modify the intermediate-frequency values by using a programmable local oscillator. This advantageously makes it possible to adapt the receiving device to the presence of new interference signals.

The calibration method described with respect to FIG. 5 can be adapted, by reiterating steps 54 and 56, so as to optimize at least one of the following criteria:

a) minimization of the number of useful signals having a signal/noise ratio greater than a predetermined value on only one of the conversion chains;

b) minimization of the number of conversion chains required in order to process the set of useful signals; and/or c) maximization of the number of useful signals having a signal/noise ratio greater than a predetermined value over the set of conversion chains.

Criterion b) is used advantageously for the sake of economy, reducing the required number of conversion chains while criteria a) and c) are particularly beneficial in a base station having antenna diversity since they make it possible to have a maximum number of channels in which at least two signals are available in order to carry out antenna diversity calculations.

A person skilled in the art will have no difficulty in understanding the principle of this invention in the case of receivers with IQ architecture comprising two quadrature analog-digital converters, the latter being potentially on an intermediate frequency that is zero or close to zero.

In the claims, the word "comprising" does not exclude other elements and the indefinite article "a/an" does not exclude a plurality.

The invention claimed is:

1. A device for receiving a broadband multi-channel radiofrequency signal comprising:
    a radiofrequency analog input stage connected to an intermediate-frequency conversion stage, said conversion stage comprising at least one conversion chain comprising a frequency mixer transposing the broadband multi-channel radiofrequency signal to an intermediate frequency connected to the input of an analog-digital converter having a sampling frequency,
    wherein the intermediate frequency and the sampling frequency of each conversion chain are selected such that, considering the noise generated by the sampling overtones of the corresponding analog-digital converter, each of the channels of the broadband multi-channel radiofrequency signal has a signal/noise ratio greater than a predetermined value at the output of at least one conversion chain.

2. The device according to claim 1, wherein the conversion stage comprises at least two conversion chains, each conversion chain having an intermediate-frequency/sampling frequency pair different from the other conversion chains.

3. The device according to claim 2, wherein the sampling frequencies of the analog-digital converter are identical and the intermediate frequencies different for all the conversion chains.

4. The device according to claim 3, wherein the spacing of the intermediate frequencies is a multiple of a predetermined frequency.

5. The device according to claim 4, wherein the predetermined frequency is equal to the spacing between channels.

6. The device according claim 1, wherein the input stage comprises several receiving chains each comprising an antenna and working with antenna diversity such that each conversion chain is connected in series to at least one receiving chain.

7. The device according to claim 6, wherein one single conversion chain only is connected in series to each receiving chain.

8. The device according to claim 1, further comprising calibration means configured to: characterize an output spectrum of the analog-digital converter to determine relative positions of the sampling overtones to channels of the broadband multi-channel radiofrequency signal; and adjust the selection of the intermediate frequency and the sampling frequency of each conversion chain to provide the signal/noise ratio greater than the predetermined value.

9. A base station of a wireless telecommunication network, comprising a receiving device for receiving a broadband multi-channel radiofrequency signal comprising:
a radiofrequency analog input stage connected to an intermediate-frequency conversion stage, said conversion stage comprising at least one conversion chain comprising a frequency mixer transposing the broadband multi-channel radiofrequency signal to an intermediate frequency connected to the input of an analog-digital converter having a sampling frequency,
wherein the intermediate frequency and the sampling frequency of each conversion chain are selected such that, considering the noise generated by the sampling overtones of the corresponding analog-digital converter, each of the channels of the broadband multi-channel radiofrequency signal has a signal/noise ratio greater than a predetermined value at the output of at least one conversion chain.

10. The base station according to claim 9, wherein the selection of the sampling and transposition frequencies is carried out in order to increase the signal/noise ratio taking account of the overtone signals originating from the frequencies of the channels internal to the base station or used by the adjacent base stations.

11. The base station according to claim 9, wherein the conversion stage comprises at least two conversion chains, each conversion chain having an intermediate-frequency/sampling frequency pair different from the other conversion chains.

12. The base station according to claim 11, wherein the sampling frequencies of the analog-digital converter are identical and the intermediate frequencies different for all the conversion chains.

13. The base station according to claim 12, wherein the spacing of the intermediate frequencies is a multiple of a predetermined frequency.

14. The base station according to claim 13, wherein the predetermined frequency is equal to the spacing between channels.

15. The base station according claim 9, wherein the input stage comprises several receiving chains each comprising an antenna and working with antenna diversity such that each conversion chain is connected in series to at least one receiving chain.

16. The base station according to claim 15, wherein one single conversion chain only is connected in series to each receiving chain.

17. The base station according to claim 9, further comprising calibration means configured to: characterize an output spectrum of the analog-digital converter to determine relative positions of the sampling overtones to channels of the broadband multi-channel radiofrequency signal; and adjust the selection of the intermediate frequency and the sampling frequency of each conversion chain to provide the signal/noise ratio greater than the predetermined value.

18. A receiver, comprising:
a radiofrequency analog input stage configured to receive a broadband radiofrequency signal including a plurality of channels;
a first intermediate-frequency conversion stage including:
a first frequency mixer coupled to an output of the radiofrequency analog input stage and to receive a first mixing frequency and configured to frequency convert the received broadband radiofrequency signal to a first intermediate frequency; and
a first analog-digital converter coupled to an output of the first frequency mixer and operating at a first sampling frequency to produce first sampling overtones;
a second intermediate-frequency conversion stage including:
a second frequency mixer coupled to an output of the radiofrequency analog input stage and to receive a second mixing frequency and configured to frequency convert the received broadband radiofrequency signal to a second intermediate frequency; and
a second analog-digital converter coupled to an output of the second frequency mixer and operating at a second sampling frequency to produce second sampling overtones;
wherein the first mixing frequency and first sampling frequency are selected such that a first channel within the broadband radiofrequency signal is output with a first channel signal to first sampling overtones ratio in excess of a predetermined value; and
wherein the second mixing frequency and second sampling frequency are selected such that a second channel within the broadband radiofrequency signal is output with a second channel signal to second sampling overtones ratio in excess of the predetermined value; and
wherein the first overtones preclude receipt of the second channel by the first intermediate-frequency conversion stage and the second overtones preclude receipt of the first channel by the second intermediate-frequency conversion stage.

19. The receiver of claim 18, wherein the first and second overtones comprise overtones produced from the interfering signals as well as the first and second channels.

* * * * *